US 6,598,987 B1

(12) United States Patent
Parikka

(10) Patent No.: US 6,598,987 B1
(45) Date of Patent: Jul. 29, 2003

(54) METHOD AND APPARATUS FOR DISTRIBUTING LIGHT TO THE USER INTERFACE OF AN ELECTRONIC DEVICE

(75) Inventor: Marko Parikka, Halikko (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/594,872

(22) Filed: Jun. 15, 2000

(51) Int. Cl.[7] ............................................. G01D 11/28
(52) U.S. Cl. ........................ 362/26; 362/24; 362/85; 362/30; 385/10; 385/901
(58) Field of Search .......................... 362/26, 24, 85, 362/29, 30, 330, 31; 385/10, 901

(56) References Cited

U.S. PATENT DOCUMENTS

| | | | | |
|---|---|---|---|---|
| 5,153,590 A | * | 10/1992 | Charlier | 341/31 |
| 5,703,667 A | * | 12/1997 | Ochiai | 349/65 |
| 5,899,553 A | * | 5/1999 | Howell | 362/84 |
| 6,011,602 A | * | 1/2000 | Miyashita et al. | 349/65 |
| 6,020,944 A | * | 2/2000 | Hoshi | 349/62 |

* cited by examiner

Primary Examiner—Sandra O'Shea
Assistant Examiner—Ronald E. DelGizzi
(74) Attorney, Agent, or Firm—Perman & Green, LLP

(57) ABSTRACT

A system and method is described for distributing light within a light guide which is used for illuminating the user interface of an electronic device. The light guide is formed as a thin film and impressed with a pattern of input and output diffraction gratings to control the transmission of light into and out of the light guide to efficiently illuminate the user interface.

20 Claims, 4 Drawing Sheets

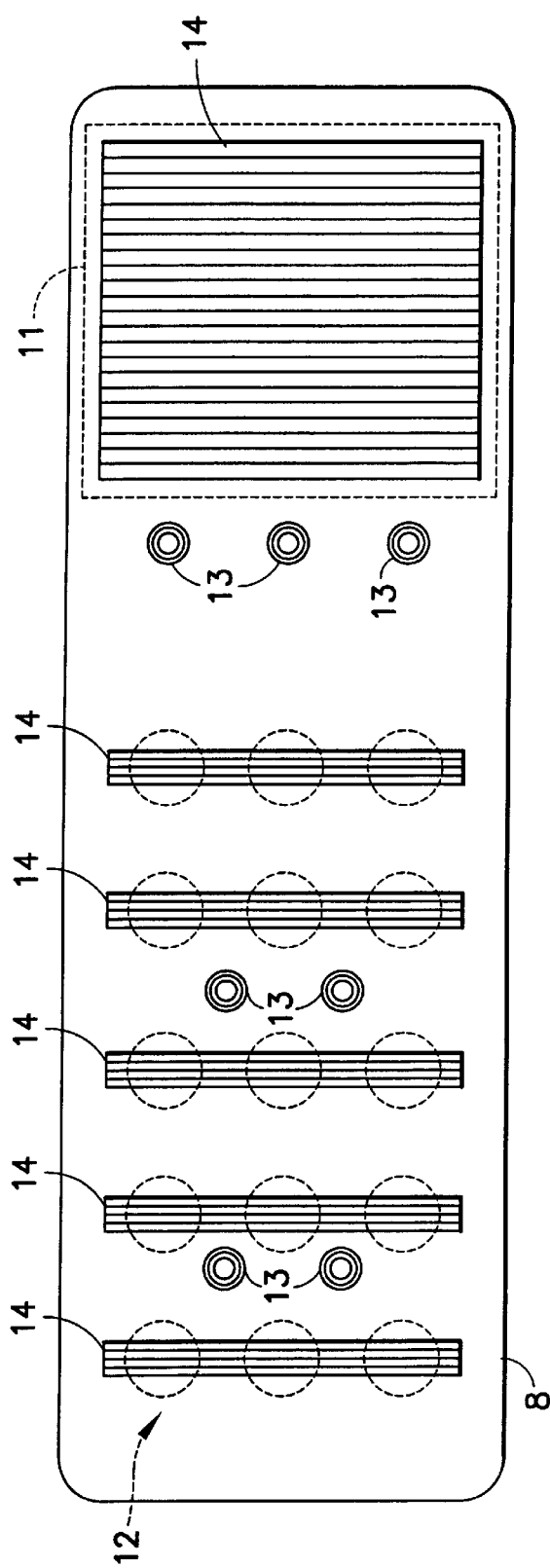
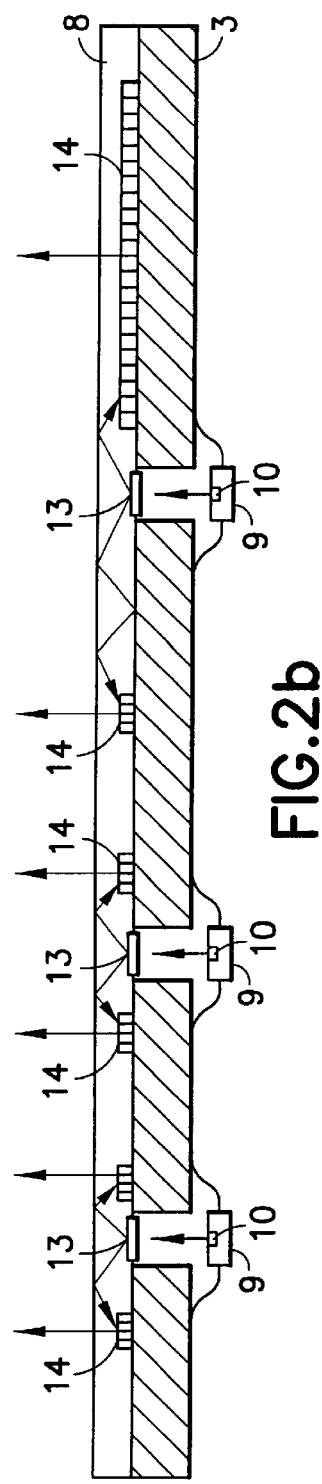
FIG.2a
FIG.2b

METHOD AND APPARATUS FOR DISTRIBUTING LIGHT TO THE USER INTERFACE OF AN ELECTRONIC DEVICE

BACKGROUND OF THE INVENTION

Mobile telephones and similar communication devices are rapidly expanding in use and function. Such devices will soon provide Internet access, personal information management, facsimile, and messaging, in addition to telephone communication. This will require a user interface which is more complex, crowded and generally more difficult to use. In addition, electronic devices, such as mobile phones, pagers and the like, are being used in ever expanding situations and environments. Inevitably the devices will be used where only limited light is available, thereby making it even more difficult to operate the user interface. Accordingly effective internal lighting will be an important feature of these devices.

Providing a bright and efficient light source at a reasonable price has become more and more difficult as the devices have been reduced in size and packed with an ever increasing number of features. To accommodate the packaging and cost demands, it is desirable to use a printed circuit board that has its components, including light emitting diodes (LEDs) for illumination, mounted on only one side of the board, referred to as the component side. In many instances the buttons, display and other components of the user interface, which require illumination, are located facing the opposite side of the board. The board therefore will impede the illumination of these components. To resolve this problem, an optical light guide is used to receive light through an opening in the board and bend it to illuminate the desired components. A so called through-the-board light source is constructed to direct the light of an LED through the opening in the printed circuit board.

The relative positioning of the light guide and light sources requires optimized coupling of the components to maximize the distribution of light within the light guide. In the systems of the prior art, as shown in FIGS. 1a and 1b, edge coupling and surface coupling is often used. Each has its limitations, edge coupling works reasonably well when the light guide is thick enough to receive a majority of the light generated by the LED. Since it is desirable to make mobile communications devices thinner, edge coupling is a limitation on design advance. Surface coupling is inherently less efficient because of the need to bend the light which results in the light escaping out of the light guide, as shown in FIG. 1b. Modification of the surface geometry of the light guide to retain more light and reduce losses is attempted, but with only limited success.

A purpose of this invention is, therefore, to provide a lighting system for the user interface components of an electronic device, such as a mobile communication device. More particularly, it is a purpose of this invention to distribute the light from an LED into a light guide with improved efficiency while allowing the thickness of the light guide to be reduced significantly. Another object of this invention is to construct an input diffraction optical element (DOE), such as a grating structure, operatively associated with a light guide to distribute the light from an LED throughout the light guide. It is a further purpose of this invention to use an output diffraction optical element in association with a light guide to transmit light from the light guide to the components of the user interface.

SUMMARY OF THE INVENTION

A system for distributing light within a thin light guide is provided using diffraction gratings as a means to optically couple the light from a source, such as a light emitting diode (LED), to the light guide. Planar style light guides have been used to supply light to the user interface of a mobile telephone or other communications device in the past, but the reduction of the thickness of the light guide was limited in order to maintain a reasonable level of coupling efficiency. By the use of diffraction gratings and the like as a coupling mechanism, the light guide can be reduced considerably in thickness while increasing the coupling efficiency.

In the system of this invention the input grating coupling is optimized for each application and the system can include an array of LEDs each having its optimized input grating. By also using diffraction gratings also to out couple the light from the light guide an extremely uniform source of illumination is provided to sensitive user interface components such as a liquid crystal display (LCD)

The pattern of user interface illumination is established for a particular application. This determines the configuration of the light guide, its associated diffraction gratings and the array of LEDs required. A master grating pattern is constructed by means, for example: electron beam lithography and assembled with the light guide in the molding or pressing process of the light guide. In this manner an extremely thin light guide is constructed having increased coupling efficiency.

DESCRIPTION OF THE DRAWING

The invention is described in more detail below with reference to the attached drawing in which:

FIG. 2a is a bottom view of the light guide of this invention;

FIG. 2b is a side view of the lighting system of this invention;

DESCRIPTION OF THE PREFERRED EMBODIMENT

The light distribution system of this invention is described below with reference to a mobile communications device such as a cellular telephone, but it should be noted that the system is equally adaptable to other types of electronic devices such as personal information managers, computers, pagers, game controllers and the like.

Figure 4:
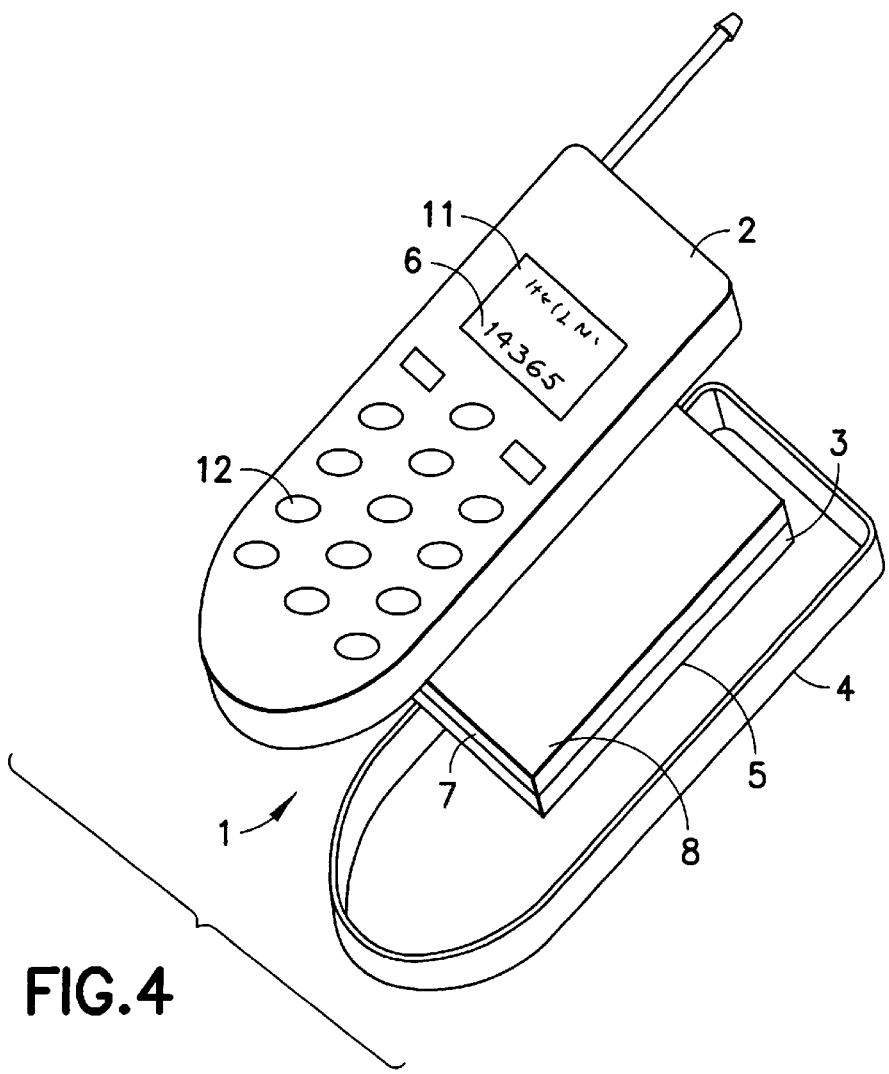
FIG. 4 is a perspective view of a typical communications device in which the invention may be used.

A mobile device 1 is illustrated in FIG. 4 and it is constructed with a front cover 2, a printed circuit board 3, and a back cover or base 4. These elements are assembled to form an operational unit in a conventional manner. Printed circuit board 3 has a component side 5 to which all of its components are soldered and an inactive side 7 to which no components can be soldered. Front cover 2 contains the user interface 6 which consists of a liquid crystal display 11 and a series of buttons forming a keyboard 12. In order to use the user interface 6 in situations of limited ambient light, the display and buttons need to be back lit internally.

Figure 3A:
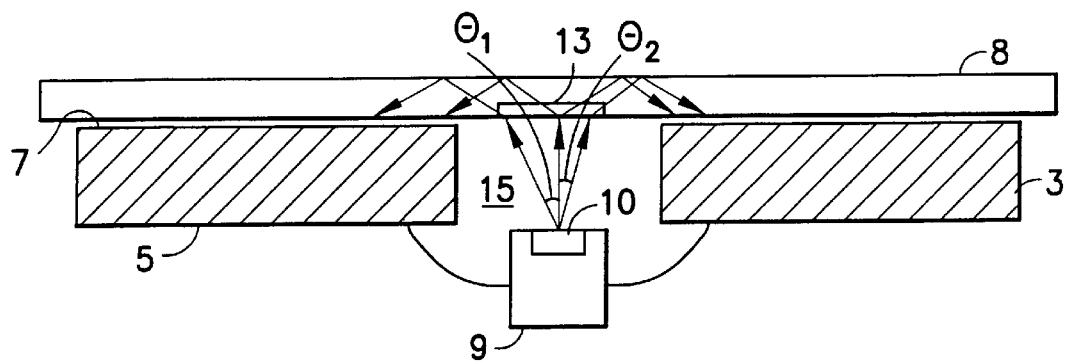
FIG. 3a is an enlarged side view of the lighting system of this invention.

An optical light guide 8 is mounted on the inactive side 7 of the circuit board 3 to receive light from an array of LEDs 9 connected on the component side of the circuit board 3 through openings 15, as shown in FIGS. 2b and 3a. The guide 8 distributes the light emitted from the LEDs 9 towards, for example, the liquid crystal display 11 and keyboard 12 of the user interface 6.

Figure 1A:
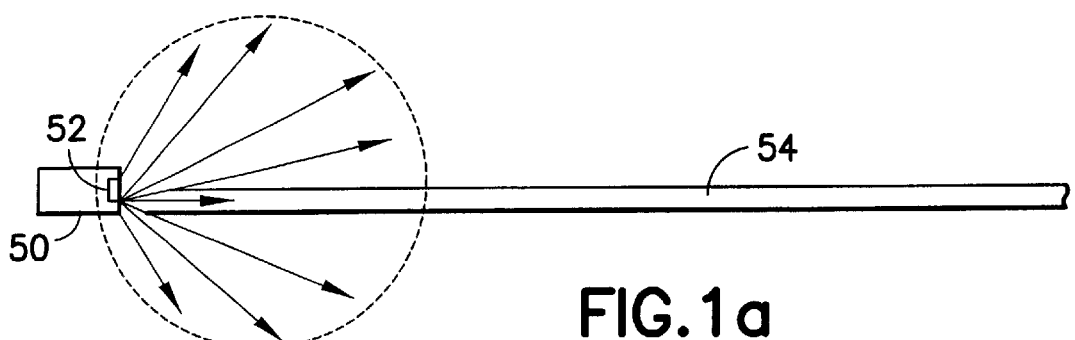
FIG. 1a is a schematic illustration of the use of edge coupling of an LED to a light guide.
Figure 1B:
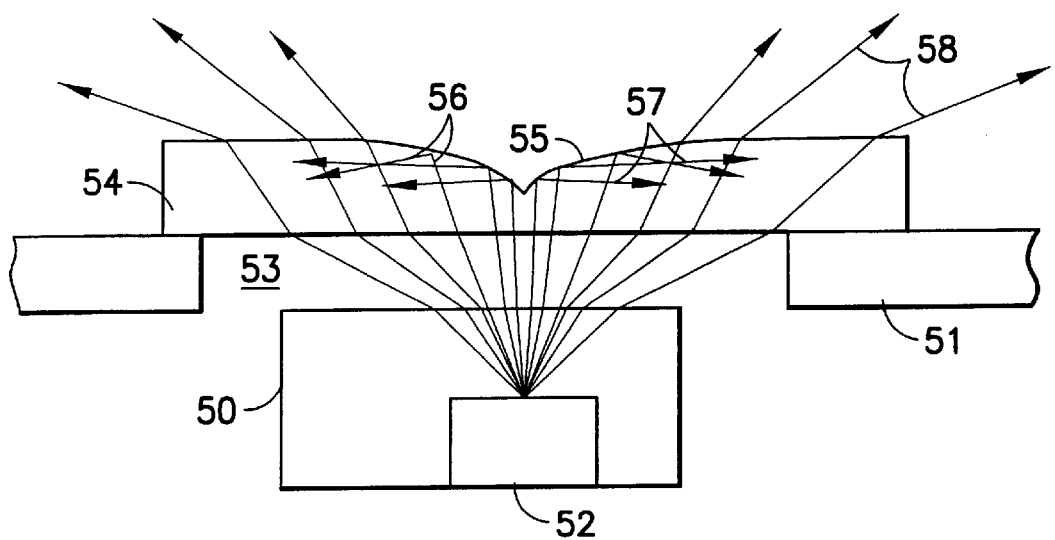
FIG. 1b is a schematic illustration of the use of surface coupling of an LED to a light guide.

In the prior art, as shown in FIG. 1b, an LED 50 is mounted on a printed circuit board 51 with the diode chip 52 emitting light through an opening 53 in circuit board 51. An optical light guide 54 is mounted opposite to the diode chip 52 over the opening 53. light guide 54 is constructed with the optimizing shaped surface 55 extending substantially across the opening 53 to bend the light, depicted in FIG. 1b as arrows 58, passing through the opening 53 at approximately right angles. As shown by arrows 56 and 57, light at the side extremities of the beam will be propagated through the light guide 54 and be wasted. This can be effective, providing there is sufficient thickness in the light guide. Otherwise, the inefficiencies of this configuration result in the use of higher power or a more efficient, i.e. more expensive, LED than is necessary and results in undesirable power dissipation or expense. In FIG. 1a an edge illuminated light guide is shown where the light guide 54 is too thin to receive the full light intensity generated by the LED chip 52. The efficiency of this latter system is limited when the light guide is thin.

To provide a more efficient delivery of light to the components of user interface 6 a system is provided which utilizes through the board lighting from an array of LEDs 9. The light is coupled to light guide 8 by the use of input diffraction optical elements (DOE), such as diffraction gratings 13 associated with the light guide 8. Utilizing appropriate optical relationships, an input grating pattern is designed which takes into consideration the angular spectrum and dimensions of the LED, the dimensions and composition of the light guide, and the amount of light required. Through these calculations the grating configuration is optimized for each application. In the preferred embodiment, an output grating pattern 14 is also designed to extract the light from the light guide in the appropriate area to illuminate user interface components, such as keyboard 12 and LCD 11.

Figure 3B:
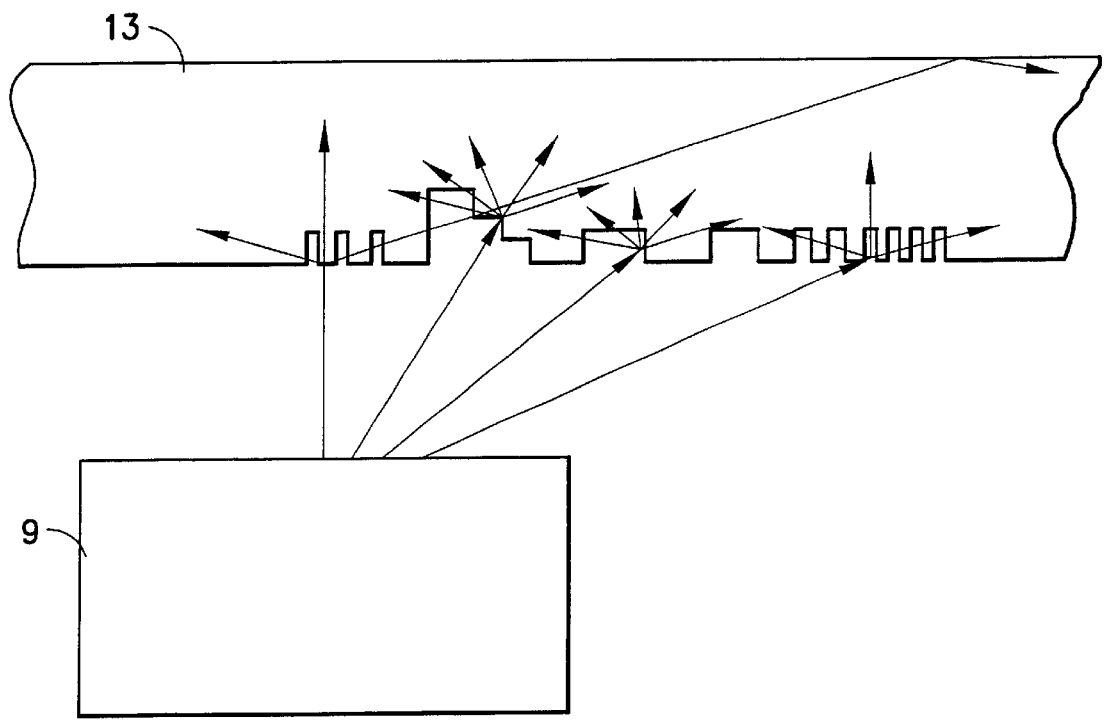
FIG. 3b is an enlarged view of a grating structure for use in this invention.

The basic components of the light delivery system of this invention are shown in FIG. 3a. Printed circuit board 3 supports and connects the operating components of the electronic device, i.e. mobile communications device 1 on its component side 5. A light guide 8 is mounted to circuit board 3 at its inactive side 7. To provide an optical path for the transmission of light to the light guide 8, an opening 15 is constructed in the circuit board 3. LED 9 is connected to the component side 5 with its light emitting chip 10 aligned with the opening 15. A diffraction grating 13 is constructed on the underside of the light guide 8 to receive the light emitted from diode 9. Grating 13 diffracts the light in accordance with the characteristics of the light guide 8 to cause an efficient distribution of the light within the light guide 8. As shown in FIG. 3b, the diffraction surface is varied in order to accommodate the spectrum of incident angles of the typical LED.

Figure 5A:
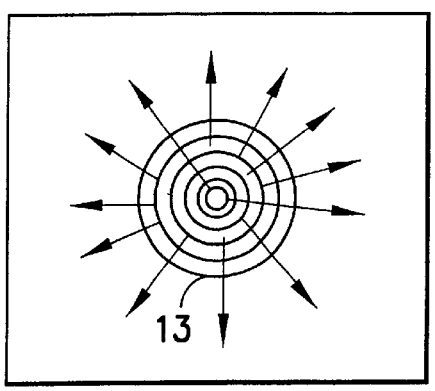
FIG. 5a is an alternate embodiment of a grating structure.
Figure 5B:
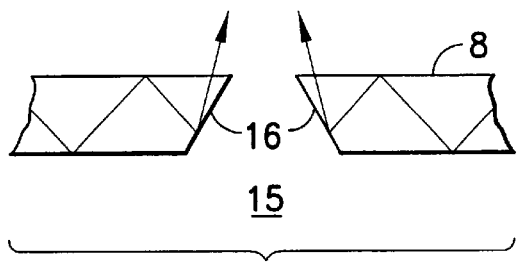
FIG. 5b is an alternate embodiment of an output diffraction element.

As shown in FIG. 2b, to enhance the delivery of light to the user interface 6, a series of output gratings 14 are constructed in the light guide 8 to extract the transmitted light out of the light guide at predetermined locations coincident with the locations of the interface components, i.e. LCD 11 and keyboard array 12. Other forms of extracting surfaces are potentially usable, for example the opening 15 having conical surface 16, as shown in FIG. 5b.

To accomplish the purpose of this invention, the input grating 13 is designed to diffract the light from LED 9 into an angle greater than the total internal reflections γ of the light guide 8, where, assuming a refractive index of n=1.5, γ≈42°. Using this as a guide, the grating dimensions and pattern may be optimized by using known formulas (see, Diffractive *Optics for Waveguide Display*, chapter 3, Pasi Laakonen, Jun. 16, 2000, Doctoral Thesis, University of Joensuu, Joensuu, Finland the substance of which is incorporated into this application by reference. A pattern of gratings which is optimized for each angle of incidence is developed using the Nelder Mead simplex search algorithm. In addition the placement of the LED relative to the grating and the length of the grating are also optimized. The grating comprises an array of minute grooves which are varied in depth, width and length to accommodate the spectrum of incident angles, as shown in FIG. 3b. Instead of straight gratings a circular grating configuration, as shown in FIG. 5a, can be generated and used for either out-coupling or in-coupling.

Once the input and output grating configurations are established the overall pattern can be generated on a thin film by electron beam lithography or other means. This can be used as a master to impress the grating pattern on the light guide as the light guide is molded or pressed. This will allow the light guide to be manufactured with integral in-coupling and out-coupling diffractive gratings. In this manner the light guide distribution system may be made as thin as possible to accommodate overall design goals for an electronic device. Light guides presently being used have a thickness in the order of from 1.2 to 1.5 mm. Through the use of this invention, such light guides can be executed in thin films having a thickness in the range of 0.2 to 0.4 mm.

I claim:

1. In an electronic device having a circuit board with first and second sides, operating components connected to said first side of said circuit board, and a user interface assembled on said second side, a system for illuminating the user interface comprising:

a source of light operatively connected to the circuit board on said first side, said light source aligned with an opening constructed in said circuit board which allows said light to be transmitted from said first side to said second side;

a light guide assembled between said user interface and said second side to receive light transmitted by said light source; and an input diffraction optical element positioned within said light guide to diffract the light transmitted into the light guide to distribute said light within the light guide.

2. In an electronic device having a circuit board with first and second sides, operating components connected to said first side of said circuit board, and a user interface assembled on said second side, a system for illuminating the user interface, according to claim 1 wherein said diffraction optical unit is a diffraction grating having a pattern which causes a different angle of diffraction for different angles of incidence of said light source.

3. In an electronic device having a circuit board with first and second sides, operating components connected to said first side of said circuit board, and a user interface assembled on said second side, a system for illuminating the user interface, according to claim 1 wherein said user interface has spaced components to be illuminated, wherein said system further comprises at least one output diffraction optical element associated with said light guide to diffract light within the light guide out of the light guide in spatial relation to said spaced components.

4. In an electronic device having a circuit board with first and second sides, operating components connected to said first side of said circuit board, and a user interface assembled on said second side, a system for illuminating the user interface, according to claim 3 wherein said at least one output diffraction optical element further comprises multiple diffraction gratings operatively associated with certain of said spaced components.

5. In an electronic device having a circuit board with first and second sides, operating components connected to said first side of said circuit board, and a user interface assembled on said second side, a system for illuminating the user interface, according to claim 1, wherein said light source includes an array of light emitting diodes aligned with associated openings in said circuit board to transmit light to predetermined portions of said light guide and wherein said system further includes an input diffraction grating operatively associated with said light guide to receive light from each of the light emitting diodes of said array and diffract the light transmitted into the light guide at an angle optimized to maximize the portion of light distributed within the light guide.

6. In an electronic device having a circuit board with first and second sides, operating components connected to said first side of said circuit board, and a user interface assembled on said second side, a system for illuminating the user interface, according to claim 3, wherein the spaced components include a keyboard and a liquid crystal display panel.

7. A light guide for distributing light within an electronic device for illuminating the user interface thereof comprising:
    a light guiding panel to receive light from a light source at a predetermined location on said panel; and
    an input diffraction optical element positioned within said light guide to diffract the light transmitted into the light guide to distribute said light within the light guide.

8. A light guide for distributing light within an electronic device for illuminating the user interface, according to claim 7, wherein the input diffraction optical element is a diffraction grating.

9. A light guide for distributing light within an electronic device for illuminating the user interface thereof, according to claim 7, further comprising an output diffraction optical element operatively associated with said light guide to diffract light within the light guide out of the light guide to illuminate a predetermined portion of said user interface.

10. A light guide for distributing light within an electronic device for illuminating the user interface, according to claim 9, wherein the output diffraction optical element is a diffraction grating.

11. A light guide for distributing light within an electronic device for illuminating the user interface thereof, according to claim 7, wherein the light guide is constructed in the form of a thin film.

12. A light guide for distributing light within an electronic device for illuminating the user interface thereof, according to claim 11, wherein the input diffraction optical element comprises an array of input diffraction gratings aligned with multiple light sources impressed on the light guide in a predetermined pattern.

13. A light guide for distributing light within an electronic device for illuminating the user interface thereof, according to claim 12, further comprising an array of output diffraction optical elements operatively associated with said light guide to diffract light within the light guide out of the light guide to illuminate a predetermined portion of said user interface, said array of output diffraction gratings impressed on the light guide in a predetermined pattern.

14. A light guide for distributing light within an electronic device for illuminating the user interface, according to claim 13, wherein the output diffraction optical elements are diffraction gratings.

15. In an electronic device having a circuit board with first and second sides, operating components connected to said first side of said circuit board, and a user interface assembled on said second side, a method for illuminating the user interface thereof comprising the steps of:
    constructing openings in the circuit board extending from said first side through said second side to allow the transmission of light;
    connecting an array of light emitting diodes on the first side of said circuit board to transmit light through said openings;
    positioning a light guide on the second side of said circuit board to receive light transmitted through the openings; and
    constructing a series of input diffraction optical elements positioned within said light guide to diffract the light transmitted into the light guide to distribute said light within the light guide.

16. A light guide for distributing light within an electronic device for illuminating the user interface, according to claim 15, wherein the input diffraction optical elements are diffraction gratings.

17. In an electronic device having a circuit board with first and second sides, operating components connected to said first side of said circuit board, and a user interface assembled on said second side, a method for illuminating the user interface thereof, according to claim 15, wherein the user interface has spaced components to be illuminated, further comprising the step of constructing at least one output diffraction optical element associated with said light guide to diffract light within the light guide out of the light guide in spatial relation to said spaced components.

18. A light guide for distributing light within an electronic device for illuminating the user interface, according to claim 17, wherein the output diffraction optical element is a diffraction grating.

19. In an electronic device having a circuit board with first and second sides, operating components connected to said first side of said circuit board, and a user interface assembled on said second side, a method for illuminating the user interface thereof, according to claim 15, wherein said input and output diffraction optical elements are constructed as a unit to form a pattern and said pattern is impressed on said light guide during the construction of said light guide.

20. A method of constructing a light guide for distributing light within an electronic device for illuminating the user interface thereof comprising the steps of:
    constructing a light guiding panel in the form of a thin film to receive light from a light source at a predetermined location on said panel;
    designing a pattern of input diffraction gratings for operative association with said light guide to diffract the light transmitted into the light guide at an angle optimized to maximize the dispersion of light within the light guide;
    designing a pattern of output diffraction gratings for association with said light guide to diffract light within the light guide out of the light guide in spatial relation to said user interface; and generating a form representing said combined input and output diffraction grating patterns; and impressing said combined pattern into said light guide during the construction thereof.

* * * * *